US011700360B2

(12) United States Patent
Ziegler et al.

(10) Patent No.: US 11,700,360 B2
(45) Date of Patent: *Jul. 11, 2023

(54) AUTOMATED FEATURE ANALYSIS OF A STRUCTURE

(71) Applicant: Solaroid Corporation, Chicago, IL (US)

(72) Inventors: Dale Ziegler, Chicago, IL (US); Tim Szatko, Naperville, IL (US); Kevin Bence, Tyler, TX (US); Mohamed Ali, Chicago, IL (US)

(73) Assignee: Solaroid Corporation, Chicago, IL (US)

( * ) Notice: Subject to any disclaimer, the term of this patent is extended or adjusted under 35 U.S.C. 154(b) by 89 days.

This patent is subject to a terminal disclaimer.

(21) Appl. No.: 17/223,955

(22) Filed: Apr. 6, 2021

(65) Prior Publication Data

US 2021/0227193 A1  Jul. 22, 2021

Related U.S. Application Data

(63) Continuation of application No. 16/453,168, filed on Jun. 26, 2019, now Pat. No. 10,972,717.

(Continued)

(51) Int. Cl.
| | |
|---|---|
| *G06K 9/00* | (2022.01) |
| *H04N 13/254* | (2018.01) |
| *G01B 11/24* | (2006.01) |
| *G06T 7/62* | (2017.01) |
| *H04N 13/156* | (2018.01) |
| *G06T 7/55* | (2017.01) |

(52) U.S. Cl.
CPC ........... *H04N 13/254* (2018.05); *G01B 11/24* (2013.01); *G06T 7/55* (2017.01); *G06T 7/62* (2017.01); *H04N 13/156* (2018.05); *G06T 2207/10028* (2013.01); *G06T 2207/20221* (2013.01)

(58) Field of Classification Search
CPC .............. H04N 13/254; H04N 13/156; H04N 5/23238; G01B 11/24; G06T 7/55; G06T 7/62; G06T 2207/10028; G06T 2207/20221; G06T 7/60; G06V 10/82; G06V 20/17; G06V 20/176; G01S 17/08; G01S 17/931; B64C 2201/12
See application file for complete search history.

(56) References Cited

U.S. PATENT DOCUMENTS

2017/0278268 A1* 9/2017 Russell .................. G01B 11/14

* cited by examiner

*Primary Examiner* — Xin Jia
(74) *Attorney, Agent, or Firm* — J. Peter Paredes; Amin Talati Wasserman LLP

(57) ABSTRACT

An automated structural feature and analysis system is disclosed. A 3D device emits a volume scanning 3D beam that scans a structure to generate 3D data that is associated with a distance between the 3D device and each end point of the 3D beam positioned on the structure. An imaging device captures an image of the structure to generate image data with the structure as depicted by the image of the structure. A controller fuses the 3D data of the structure generated by the 3D device with the image data of the structure generated by the imaging device to determine the distance between the 3D device and each end point of the 3D beam positioned on the structure and to determine a distance between each point on the image. The controller generates a sketch image of the structure that is displayed to the user.

18 Claims, 7 Drawing Sheets

Related U.S. Application Data

(60) Provisional application No. 62/689,983, filed on Jun. 26, 2018.

AUTOMATED FEATURE ANALYSIS OF A STRUCTURE

CROSS-REFERENCE TO RELATED APPLICATIONS

This application is a continuation from U.S. nonprovisional application Ser. No. 16/453,168, which claims the benefit of U.S. Provisional Application No. 62/689,983, filed Jun. 26, 2018, all of which are incorporated herein by reference in their entireties.

BACKGROUND

Field of Disclosure

The present disclosure generally relates to architectural analysis of structures and specifically to three-dimensional (3D) modelling of the structure to execute the architectural analysis.

Related Art

Surveys of structures, such as roof surveys, are often times required for different purposes. For example, roof surveys are required for the installation of solar panels to determine the amount, size, and positioning of the solar panels based on the roof structure, roof inspections with regard to whether a roof upgrade is required for integrity and regulatory compliance to determine the amount, size, and positioning of roof materials, damage assessment of a roof to determine the amount, size and positioning of roof materials required to repair the damaged area, and so on. Typically, a surveyor is required to physically mount themselves to the roof of the structure to assess the roof to generate an estimate of the amount, size, and positioning of the necessary roof materials to adequately upgrade the roof whether that be with solar panels, an upgraded roof and so on.

The conventional implementation of a surveyor physically mounted on the roof significantly increases the amount of time and cost associated with generating an estimate of the time and roof materials necessary to adequately upgrade the roof while decreasing the accuracy of the estimate. Each estimate requires an actual surveyor to evaluate the roof and to devote significant time to mount the roof and to generate an estimate resulting in a significant increase in cost. Further, the surveyor is simply a person attempting to generate the estimate while on a roof rather than an automated system which decreases the accuracy of the estimate.

Further conventional automated roof surveying systems, such as Unmanned Aerial Vehicles (UAV), simply capture images of the roof from an aerial perspective above the roof. Such conventional images generated from an aerial perspective skew the roof such that the edges of different planes of the roof may be difficult to discern as well as the angles of the planes relative to the UAV as well as the structural features of the planes due to the positioning of the UAV above the roof. Further, different obstructions included on the roof, such as chimneys and skylights, that should be excluded from an evaluation of the roof may also be difficult to discern from the UAV images. The difficulty in discerning the roof hinders the accuracy in assessing the roof with regard to upgrading the roof not only by automated systems that evaluate the images but also by humans. Automated systems and even humans have difficulty in accurately discerning edges, angles, obstructions, features and so on of the roof resulting inaccurate estimates with regard to upgrading the roof.

BRIEF DESCRIPTION OF THE DRAWINGS/FIGURES

Embodiments of the present disclosure are described with reference to the accompanying drawings. In the drawings, like reference numerals indicate identical or functionally similar elements. Additionally, the left most digit(s) of a reference number typically identifies the drawing in which the reference number first appears.

FIG. 1 illustrates side-view of a structure that may be assessed with regard to an architectural analysis of the structure according to an exemplary embodiment of the present disclosure;

FIG. 2 illustrates a top-elevational view of a structure that includes a complicated roof with several different structural elements with several of the structural elements having significant pitches such that the angles of the pitches slope significantly towards the ground significantly increasing the difficulties for the surveyor to maneuver around the structure to adequately conduct the architectural assessment according to an exemplary embodiment of the present disclosure;

Figure 6:
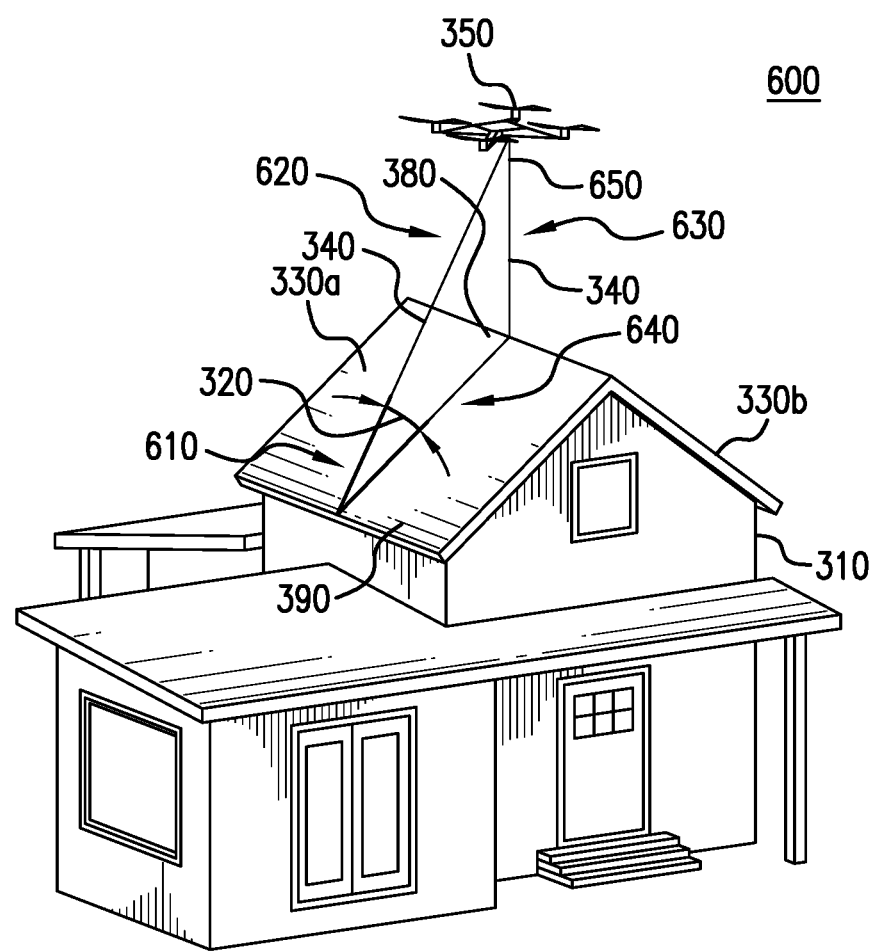
Figure 7:
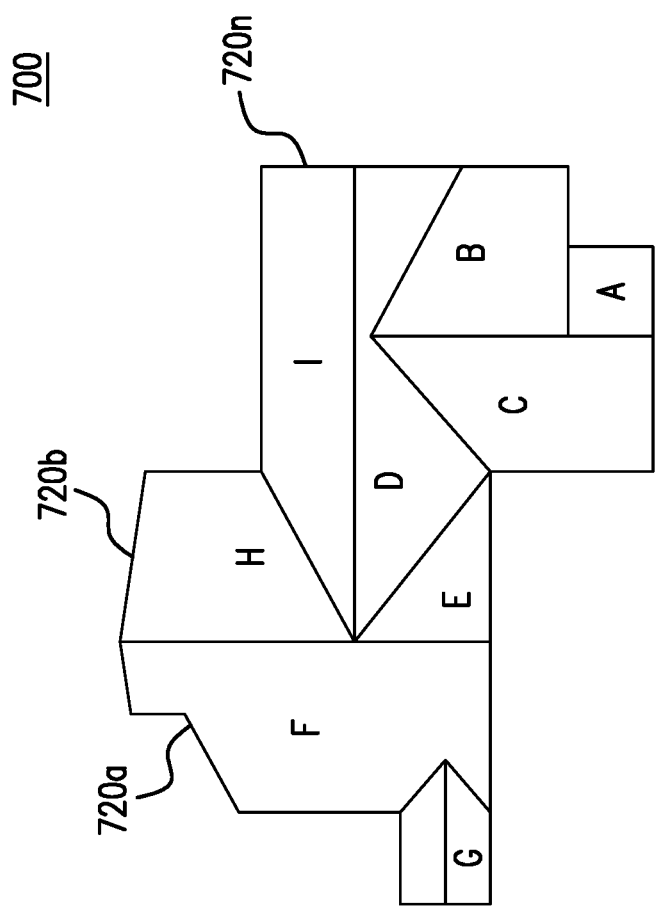
Figure 7:
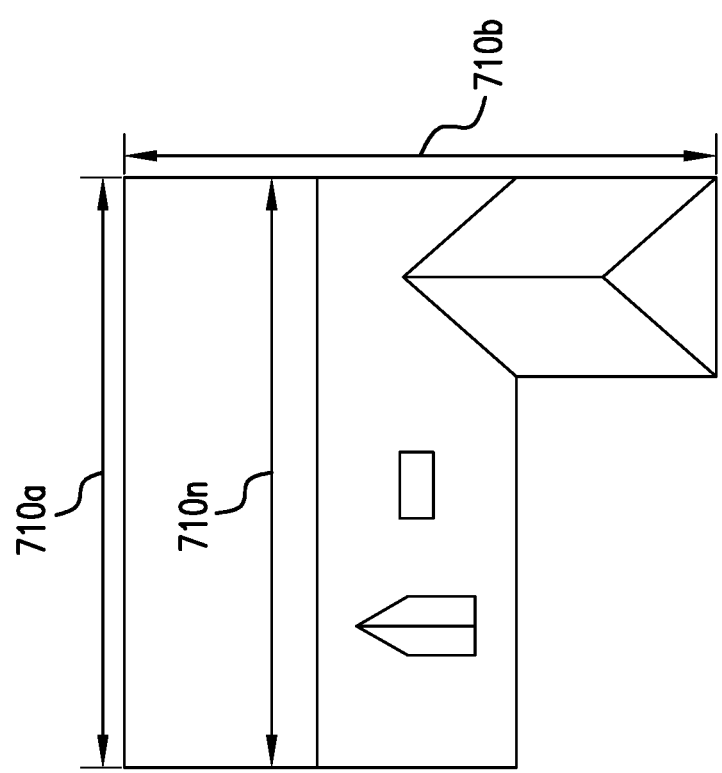

FIG. 6 illustrates a side-view of a dual 3D device and imaging device configuration such that a 3D device and an imaging device is mounted on a UAV to scan a structure to perform an architectural analysis on the structure according to an exemplary embodiment of the present disclosure; and FIG. 7 illustrates a top-elevational view of a sketch image that depicts the structure with respect to each of the segmented structural elements and obstructions as well as providing the dimensions for each of the corresponding structural elements according to an exemplary embodiment of the present disclosure.

DETAILED DESCRIPTION OF THE PRESENT DISCLOSURE

The following Detailed Description refers to accompanying drawings to illustrate exemplary embodiments consistent with the present disclosure. References in the Detailed Description to "one exemplary embodiment," an "exemplary embodiment," an "example exemplary embodiment," etc., indicate the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic may be described in connection with an exemplary embodiment, it is within the knowledge of those skilled in the art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the present disclosure. Therefore, the Detailed Description is not meant to limit the present disclosure. Rather, the scope of the present disclosure is defined only in accordance with the following claims and their equivalents.

Embodiments of the present disclosure may be implemented in hardware, firmware, software, or any combination thereof. Embodiments of the present disclosure may also be implemented as instructions applied by a machine-readable medium, which may be read and executed by one or more processors. A machine-readable medium may include any mechanism for storing or transmitting information in a form readable by a machine (e.g., a computing device). For example, a machine-readable medium may include read only memory ("ROM"), random access memory ("RAM"), magnetic disk storage media, optical storage media, flash memory devices, electrical optical, acoustical or other forms of propagated signals (e.g., carrier waves, infrared signals, digital signals, etc.), and others. Further firmware, software routines, and instructions may be described herein as performing certain actions. However, it should be appreciated that such descriptions are merely for convenience and that such actions in fact result from computing devices, processors, controllers, or other devices executing the firmware, software, routines, instructions, etc.

For purposes of this discussion, each of the various components discussed may be considered a module, and the term "module" shall be understood to include at least one software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently from any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the present disclosure that others can, by applying knowledge of those skilled in the relevant art(s), readily modify and/or adapt for various applications such exemplary embodiments, without undue experimentation, without departing from the spirit and scope of the present disclosure. Therefore, such adaptations and modifications are intended to be within the meaning and plurality of equivalents of the exemplary embodiments based upon the teaching and guidance presented herein. It is to be understood that the phraseology or terminology herein for the purpose of description and not of limitation, such that the terminology or phraseology of the present specification is to be interpreted by those skilled in the relevant art(s) in light of the teachings herein.

System Overview

Figure 1:
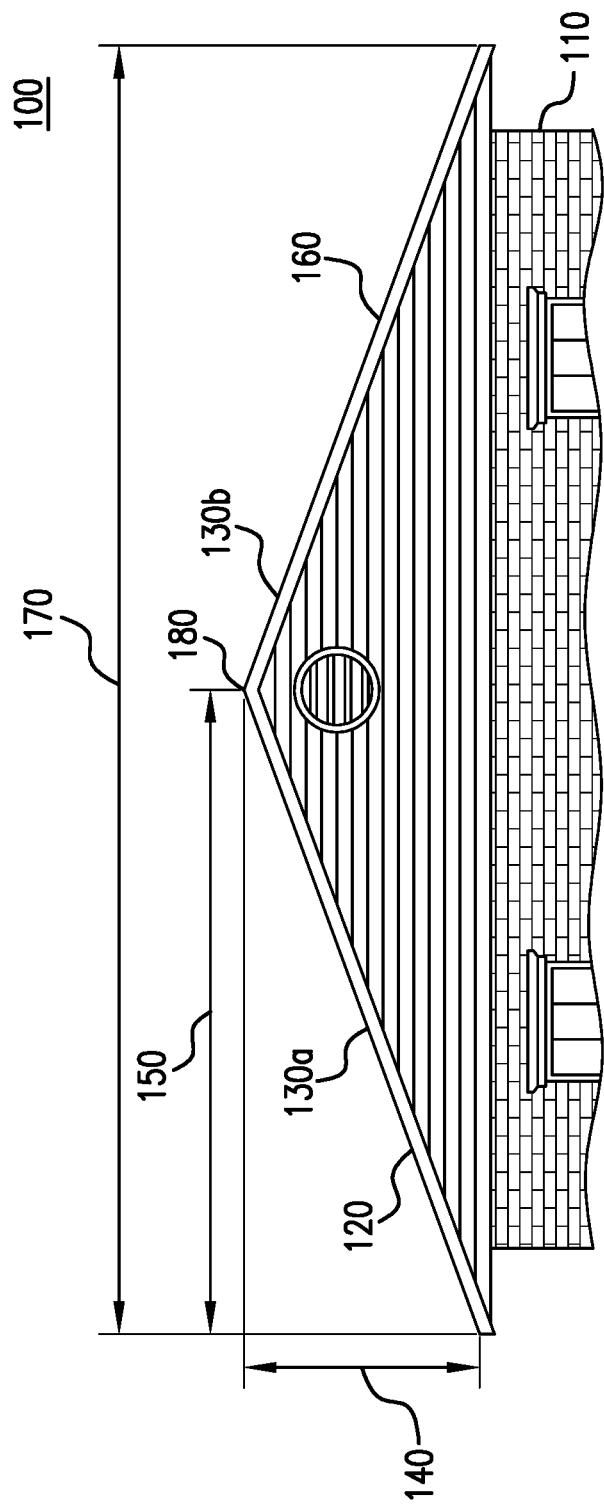

FIG. 1 illustrates side-view of a structure that may be assessed with regard to an architectural analysis of the structure. A structure 100 includes a plurality of structural elements that are specific to the structure 100 and provide variations within the structure 100. In order to properly assess the architectural analysis of the structure 100, each of the different structural elements are to be accurately identified and also assessed as individual structural elements and then pieced together to formulate an accurate architectural analysis of the overall structure. An architectural analysis of the structure 100 is an analysis of the structure 100 that is performed to determine the health of the structure 100 and/or to assess improvements and/or upgrades that are to be made to the structure 100. For example, the structure 100 may be a roof 120 of a house 110 that the owner of the house 110 requests to assess the current health of the roof 120 of the house 110 and whether an upgrade to the roof 120 is required as well as an accurate estimate.

The structure 100 may be any type of structure that includes structural elements where a user has an interest to maintain the health of the structure 100 and in doing so may upgrade the structure 100. Examples of the structure 100 include but are not limited to the roof of structures, buildings, houses, streets, bridges, parking garages, roads, highways, airports, mining operations, and/or any other type of structure that includes structural elements where a user has an interest to maintain the health of the structure that will be apparent to those skilled in the relevant art(s) without departing from the spirit and scope of the disclosure. The types of upgrades of the structure 100 that may be incorporated into an architectural analysis of the structure 100 include but are not limited to solar panel installation and maintenance, roof and roof maintenance industries, damage assessment and claim adjustment of roof damages, inspection and enforcement of building codes compliance, land and site surveys, mapping and surveying container ports, road inspections, damage assessment and/or any other of upgrade of the structure that may be incorporated into an architectural analysis that will be apparent to those skilled in the relevant art(s) without departing from the spirit and scope of the disclosure.

Structural elements included in the structure 100 are identifiable characteristics of the structure 100 that differ from other structural elements included in the structure 100. For example, as shown in FIG. 1, the structure 100 includes a roof 120 positioned on a house 110. Different structural elements of the roof 120 include a first plane 130a and a second plane 130b. A plane associated with a structure includes a segmented portion of the structure 100 that differs from other segmented portions of the structure 100. For example, the roof 120 is a roof that is segmented into the first plane 130a and the second plane 130b. The first plane 130a extends from a ridge 180 of the roof 120 and is angled from the ridge 180 at a pitch 160. The second plane 130b extends from the ridge 180 of the roof 120 and is angled from the ridge 180 at a pitch 160. The first plane 130a and the second plane 130b are segmented and are angled at the pitch 160 to encourage water run-off and so on the for the roof 120 thus requiring that the first plane 130a and the second plane 130b to be segmented from each other.

The ridge 180 of the roof 120 is the joint between two or more planes as the two or more planes then extend from the ridge 180 at the specified pitch 160. The pitch 160 is a structural dimension of the first plane 130a and the second plane 130b and is the angle of the associated plane relative to the horizon. A structural dimension is a measurement and/or dimension associated with a structural element of the structure 100 that is required to adequately assess and upgrade the structure 100. Other structural dimensions of a structure include the rise 140 of the planes, the run 150 of the planes, the span 170 of the roof, volume of the structural elements, surface area of the structural elements, height, slope, pitch, inclination, clearance texture, and/or any other structural dimension associated with structural elements of the structure 100 that will be apparent to those skilled in the relevant art(s) without departing from the spirit and scope of the disclosure. Structural elements of the structure also include but are not limited to the hip, rake, gable, eave, rooftop valleys, ridges, edges, and/or any other type of structural element included in the structure 100 that provides variations within the structure 100 and are identifiable characteristics of the structure 100 that will be apparent to those skilled in the relevant art(s) without departing from the spirit and scope of the disclosure.

In order to assess and then upgrade the structure 100, a survey of the structure 100 is required to determine the different structural elements included in the structure 100 as well as the structural dimensions corresponding to the different structural elements that include but are not limited to how the different structural elements included in the structure 100 are oriented relative to each other, the dimensions of the structural elements, the pitch 160 of the structural elements and so on. FIG. 1 depicts different structural elements that require distinctive measurements to adequately perform an architectural analysis of the roof 120 as obtained via a survey. For example, FIG. 1 depicts the structural elements of the first plane 130*a* and the second plane 130*b* that are segmented from each other with both the first plane 130*a* and the second plane 130*b* having the structural dimensions of rise 140, pitch 160, run 150, and the span 170 with each being distinctive measurements required by the survey to adequately assess and then upgrade the structure 100. The identification of the different structural elements and the corresponding structural dimensions are required by the survey to adequately assess the structural elements of the structure 100 and the time and materials required to adequately upgrade the structure 100 based on the assessment.

Conventional approaches to executing a survey to conduct an architectural analysis of the structure 100 require that the surveyor actually physically mount the structure 100 and then execute the assessment and architectural analysis of each of the structural elements and the structural dimensions. The actual physical mounting of the structure 100 by the surveyor significantly increases the amount of time required to conduct each survey as well as the costs in that there is a significant time allotment associated with each surveyor mounting the structure 100 as well as a significant cost allocation required for each surveyor to be positioned on the structure 100 to perform the survey. The amount of structures that require a survey is often times significant and requiring a surveyor to actually mount each structure and then execute the survey significantly increases the cost to perform each survey as well as the time required.

For example, a large roofing company and/or insurance company may have hundreds of roofs to assess at a given time. Simply requiring that a surveyor actually physically be present at each location and then to physically mount each roof and then manually perform the survey could require a couple of hours to complete. In order to satisfy the significant demand for surveys, such roofing companies and/or insurance companies would have to employ a significant staff of surveyors to satisfy the demand with an increased cost due to the time required for each surveyor to manually conduct the survey.

Figure 2:
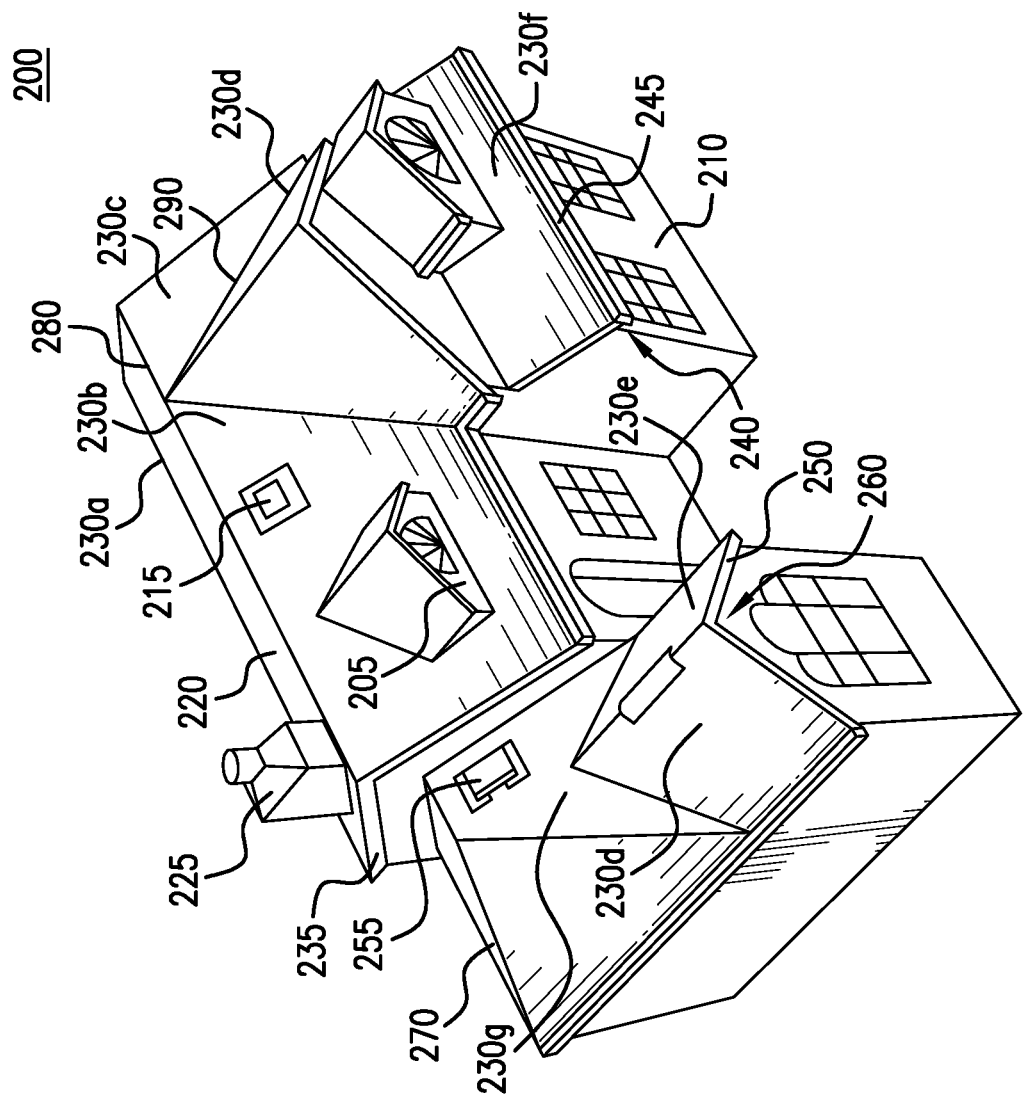

Further, the structures required to be surveyed by surveyors to perform an architectural analysis on the structures may be complicated in that the structures include several different structural elements with different structural dimensions as well as being dangerous for a surveyor to maneuver on without falling from the structure and causing significant bodily injury. FIG. 2 illustrates a top-elevational view of a structure that includes a complicated roof 220 with several different structural elements with several of the structural elements having significant pitches such that the angles of the pitches slope significantly towards the ground significantly increasing the difficulties for the surveyor to maneuver around the structure to adequately conduct the architectural assessment. Incorporating conventional approaches in which a surveyor actually mounts the roof 220 of the house 210 to conduct the survey for the architectural analysis simply increases the risk of physical harm to the surveyor as well as significantly increasing the cost of the survey due to the significant increase in difficulty to conduct the survey by the surveyor.

However, conventional approaches where images of the structure 200 are captured from a positon located above the structure 200 as depicted in FIG. 2 where the image captured of the structure 200 is a top-elevational view of the structure 200 also provide deficient results with regard to executing a survey to generate an accurate architectural analysis. Conventional approaches that capture top-elevational views of the structure 200, such as capturing grey scale images of the structure 200 by an imaging device positioned on a UAV eliminates the requirement of a surveyor physically positioning themselves on the roof 220 of the structure 200. However, such conventional approaches have a decreased accuracy regarding the identification and the assessment of the different structural elements and the associated structural dimensions included in the structure 200.

Although, conventional approaches that capture a top-elevational view of the structure 200 eliminate the requirement for a surveyor to actually mount the roof 220 of the structure 200, such conventional approaches still require that a user assess the images captured of the top-elevational view of the structure 200 to identify the different structural components and the associated structural dimensions to execute the architectural assessment of the structure 200. However, the image that captures the top-elevational view of the structure 200 is often times skewed based on the lack of contrast and distinction in the structural elements that are depicted in the image that is required for the user to adequately assess the image of the top-elevational view of the structure 200 to generate an accurate architectural analysis.

For example, as shown in FIG. 2, structural elements included in the roof 220 of the structure 200 as depicted in the image of the top-elevational view of the structure 200 may be difficult for a user to identify. In such an example, the user may have difficulty in determining the boundaries of the first plane 230*a* and the second plane 230*b* as well as the ridge 280 separating the first plane 230*a* form the second plane 230*b*. Often times a conventional image of the top-elevational view of the structure 200 may be skewed such that the pitch of the first plane 230*a* and the second plane 230*b* is difficult to discern such that the conventional image depicts to the user that the first plane 230*a* and the second plane 230*b* are actually a single plane without a ridge 280 and are flat rather than having a pitch associated with each.

The conventional image of the top-elevational view of the structure 200 may also be skewed such that the user may struggle to identify the location of the edges of the different structural elements of the structure 200. In struggling to identify the location of the edges of the structural elements of the structure 200, the user may inaccurately determine the structural dimensions of the structural elements of the structure 200. The user in executing the survey via the conventional image of the top-elevational view of the structure 200 attempts to determine the distances of the different structural dimensions of the structural elements to determine the amount of material required to upgrade each of the structural elements included in the structure 200. The inability of the user to accurately identify the location of the edges of the structural elements due to the conventional image of the of the top-elevational view of the structure 200 being skewed prevents the user from accurately measuring the distances of the structural dimensions of the structural elements thereby generating inaccurate surveys.

For example, the skewed image of the conventional top-elevational view of the structure 200 prevents the user from accurately identifying the edges of first plane 230a and the edges of the second plane 230b and the edges of the third plane 230c. Without being able to accurately identify the edges of the first plane 230a, the second plane 230b, and the third plane 230c, the user is also unable to accurately determine the distances of each of the edges of the first plane 230a, the second plane 230b, and the third plane 230c. In failing to accurately determine the distances of the edges of the first plane 230a, the second plane 230b, and the third plane 230c, the user is also unable to accurately determine the amount of material required to adequately upgrade the first plane 230a, the second plane 230b, and the third plane 230c.

Further, the skewed image of the conventional top-elevational view of the structure 200 also prevents the user from accurately identifying the different structural elements. For example, the user struggles to identify the valley 290 located between the third plane 230c and the fourth plane 230d. The conventional image of the top-elevational view of the structure 200 being skewed causes the user to struggle in identifying that the third plane 230c and the fourth plane 230d slope at a pitch and are actually distinct planes separated by the valley 290. The skewed conventional image of the top-elevational view of the structure 200 also causes the user in having difficulty in identifying other structural elements included in the structure 200 such as identifying the eve 240, the rake 250, the gable 260, and/or the hip 270. Each of these different structural elements require different materials to be adequately upgraded. The failure of the user to adequately identify each of these different structural elements due to the conventional image of the top-elevational view of the structure 200 being skewed results in inaccurate estimates as the appropriate materials required to adequately upgrade each.

The failure of the conventional image of the top-elevational view of the structure 200 to clearly depict the different structural elements and the structural dimensions of the structure 200 results in the user inaccurately determining the amount of material required to upgrade the structure 200 as well as the type of material and the different types of structural dimensions required to adequately upgrade the roof. In failing to do so, the user generates inaccurate assessments regarding the cost of materials, labor required, as well as the time to complete the upgrade of the structure 200 when generating the architectural analysis of the structure 200.

Rather than simply have a skewed image of the top-elevational view of the structure 200 for the user to inaccurately perform the architectural analysis of the structure 200, a 3D scan of the structure 200 may be fused together with an image of the structure 200. The 3D scan of the structure 200 may provide the distance of each end point of a 3D beam positioned on the structure 200. The image of the structure 200 may provide image data of the structure 200 that depicts each of the structural elements of the structure 200. The fusing of the 3D scan of the structure 200 and the image of the structure 200 may provide the distance between any two points positioned on the structure such that the distance of any structural dimension of any structural element of the structure 200 may be determined from the fusing of the 3D scan and the image. A sketch image may then be generated from the fusing of the 3D scan and the image that depicts each of the structural elements as segmented from the structure 200 with the appropriate structural dimensions for each of the structural elements thereby enabling an accurate survey of the structure 200 to be automatically generated without requiring a surveyor to physically mount the structure 200 to conduct the survey.

Figure 3:
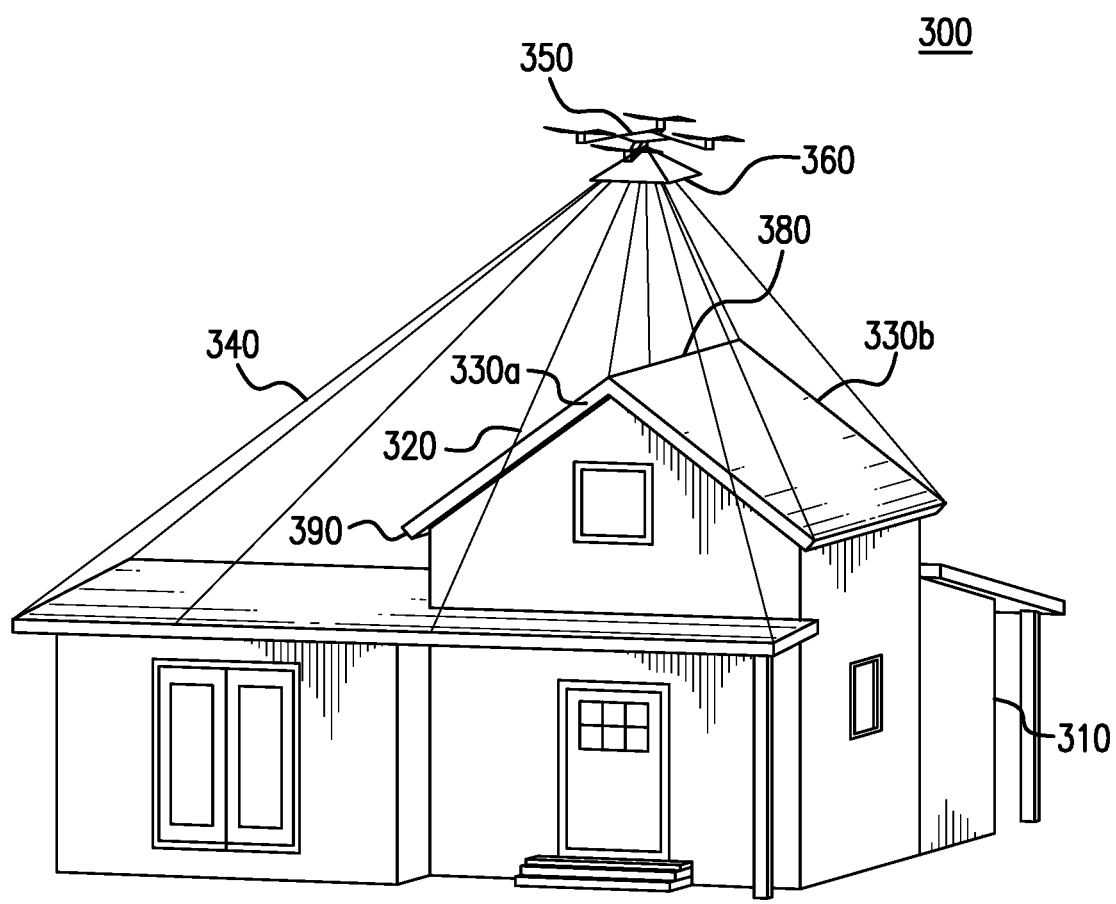
FIG. 3 illustrates a side-view of a dual 3DThree-Dimensional data acquisition device (3D device) and imaging device configuration such that a 3D device and an imaging device is mounted on a UAV to scan a structure to perform an architectural analysis on the structure according to an exemplary embodiment of the present disclosure.

FIG. 3 depicts a side-view of a dual 3D device and imaging device configuration such that a 3D device and an imaging device is mounted on a UAV to scan a structure to perform an architectural analysis on the structure. The dual 3D device and imaging device configuration 300 includes a UAV 350 that is positioned above a roof 320 of a structure 310. The UAV 300 includes a 3D device that generates a volume scanning 3D beam 340 that scans the roof 320 of the structure 310 to generate 3D data that is associated with a distance between the 3D device and each end point of the 3D beam positioned on the structure. An imaging device is also mounted to the UAV 300 and captures a top-elevational image 360 of the roof 320 of the structure 310 to generate image data associated with the roof 320 of the structure 310 as depicted by the image 360.

FIG. 3 depicts that the 3D device and the imaging device are mounted on the UAV 350. However, the 3D device and the imaging device may be mounted on any type of object that enables the 3D device to adequately emit a volume scanning 3D beam to scan the structure 310 and the imaging device to adequately capture an image 360 of the structure 310 will be apparent to those skilled in the relevant art(s) without departing from the spirit and scope of the disclosure.

The 3D device is mounted to the UAV 350 and emits a volume scanning 3D beam 340 that scans the roof 320 of the structure 310 such that end point of the 3D beam 340 is positioned throughout the roof 320 of the structure 310. In positioning the end point of the 3D beam 340 throughout the roof 320 of the structure 310, the 3D device generates 3D data associated with a distance between the 3D device and each end point of the 3D beam 340 positioned on the roof 320 of the structure 310. The 3D data is then generated for each end point of the 3D beam 340 positioned on the roof 320 of the structure 320 such that the distance of each of the different structural elements of the roof 320 from the 3D device 340 may be determined.

For example, the 3D device may be a 3D device that may emit the volume scanning 3D beam 340 to scan the first plane 330a and the second plane 330b and the ridge 380 positioned on the roof 320. In scanning the 3D beam 340 across each of the structural elements included in the roof 320, the 3D data that depicts the distance of each position on each of the structural elements from the 3D device may be determined such that each of the points included in the first plane 330a and the second plane 330b and the ridge 380 may have 3D data generated that depicts the distance of each of the points from the 3D device. The 3D device may be a 3D device that emits the 3D beam 340 that may be a 3D beam 340 such that the 3D beam 340 may be a volume scanning 3D beam. However, the 3D device may also include other type of devices that emit 3D beams 340 such as but not limited to a photogrammetry device that emits a 3D beam, a structured light 3D acquisition device that emits a 3D beam and/or any other type of 3D device that generates a 3D beam such that the 3D data generated by the 3D beam 3D includes that is associated with a distance from the end point of the 3D beam 340 and each position on the structure 310 may be incorporated will be apparent to those skilled in the relevant art(s) without departing from the spirit and scope of the disclosure.

The imaging device is also mounted to the UAV 350 and captures an image 360 of the roof 320 of the structure 310 to generate image data associated with the roof 320 of the structure 310 as depicted by the image 360 of the roof 320 of the structure 310. The imaging device may be a visible light imaging device, an infrared imaging device, an ultraviolet imaging device, and/or any other type of imaging device that adequately captures an image 360 of the structure 310 and depicts each of the structural elements included in the structure 310 that will be apparent to those skilled in the relevant art(s) without departing from the spirit and scope of the disclosure. The image 360 captured by the imaging device may be a grey scale image, a color image, a still frame of the roof 320 of the structure 310, streaming video of the roof 320 of the structure and/or any other type of image that depicts each of the structural elements included in the structure 310 that will be apparent to those skilled in the relevant art(s) without departing from the spirit and scope of the disclosure. The image data generated by the image 360 captured by the imaging device is data associated with the roof 320 of the structure 310 that is then translated into each pixel included in the image 360 to accurately depict each of the structural element included in the roof 320.

The image 360 of the roof 320 of the structure 310 captured by the imaging device may depict the roof 320 such that each of the structural elements included in the roof 320 may be accurately depicted by the image 360. In doing so, each of the structural elements may be accurately identified from the image 360 as well as each of the edges and so on for each of the structural elements such that each of the structural elements may be accurately identified and differentiated from each of the other structural elements. For example, the image 360 of the roof 320 may accurately depict the first plane 330*a* and the second plane 330*b* as well as the ridge 380 such that each of the edges associated with the first plane 330*a* and the second plane 330*b* may be accurately identified such that the first plane 330*a* is differentiated from the second plane 330*b* along with the edges of the first plane 330*a* and the second plane 330 to be identified such that the division between the first plane and the second plane 330*b* via the ridge 380 may also be accurately identified. In doing so, the image 360 may not be skewed and may depict each of the structural elements and their distinct features so that each of the structural elements may be accurately distinguished from each of the other structural elements as well as the edges of the structural elements and so on.

Rather than simply having a single conventional image of the top-elevational view of the roof 320 of the structure 310 that skews the structural elements of the roof 320 such that the structural elements 320 are difficult to depict from the conventional image, the dual 3D and imaging device configuration 300 incorporates both a 3D scan 340 of the roof 320 and an image 360 of the roof 320. The 3D scan 340 of the roof may generate a three-dimensional (3D) model of the roof 320 that may assist in the identification of the different structural elements of the roof 320 in addition to the image 360 of the roof 320.

However, the 3D data of the roof 320 as generated by the 3D device may be fused together with the image data of the structure generated by the imaging device. The fusing together of the 3D data with the image data may enable any point positioned on the roof 320 as depicted by the image 360 to have a corresponding distance associated with the point as determined from the position of the 3D device and the corresponding end point of the 3D beam positioned on the structure at the corresponding point on the image 360. In doing so, a distance between each point in the image 360 may be determined. In an embodiment, the 3D device and the imaging device may be positioned on a pan-tilt servo motor positioned on the UAV may scan the roof 320 of the structure 310 to construct a point cloud map of the surveyed structure 310.

Figure 4:
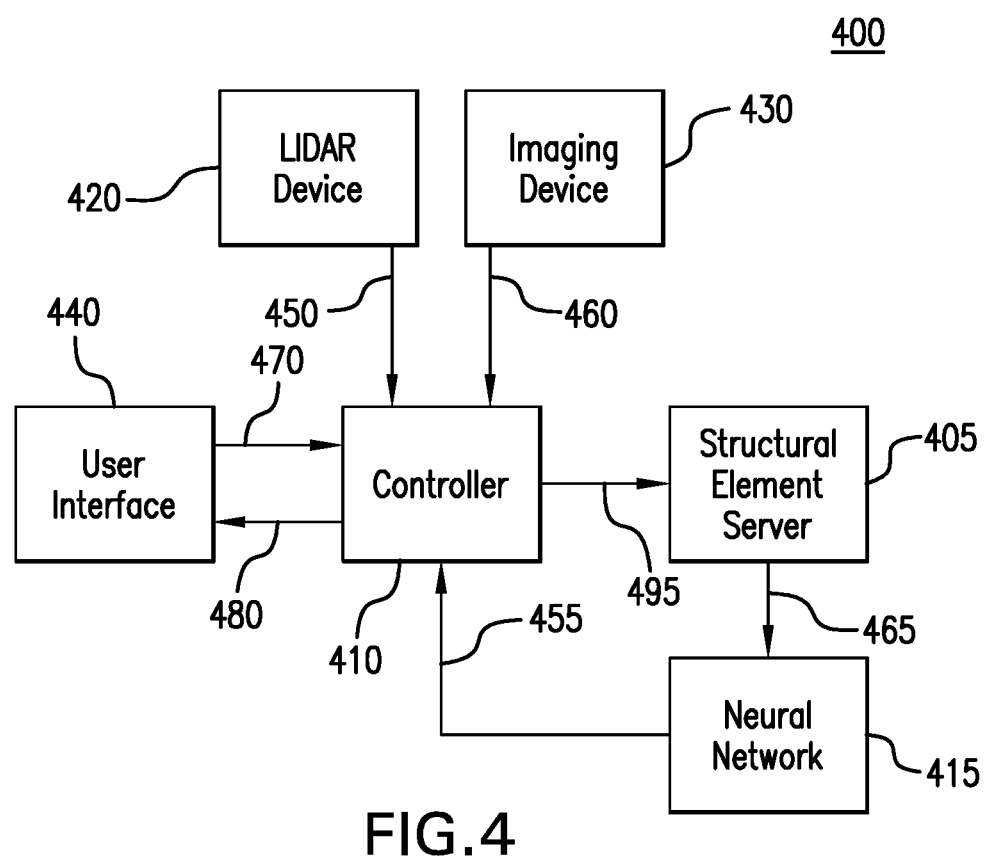
FIG. 4 illustrates an automated structural feature analysis configuration that fuses the 3DThree-Dimensional (3D) data with the image data to generate a sketch image of the structure that depicts each of the structural elements as well as the associated structural dimensions for each corresponding structural element according to an exemplary embodiment of the present disclosure.

FIG. 4 depicts an automated structural feature analysis configuration that fuses the 3D data with the image data to generate a sketch image of the structure that depicts each of the structural elements as well as the associated structural dimensions for each corresponding structural element. The automated structural feature analysis configuration 400 includes a controller 410, a 3D device 420, an imaging device 430, a user interface 440, a structural element server 405, and a neural network 415. The controller 410 may fuse the 3D data 450 of the structure 310 generated by the 3D device 420 with the image data 460 of the structure 310 generated by the imaging device 430 to determine the distance between the 3D device 420 and each end point of the 3D beam 340 positioned on the structure 310 and to determine a distance between each point on the image 360.

The controller 410 may be a device that is capable of electronically communicating with other devices. Examples of the controller 410 may include a mobile telephone, a smartphone, a workstation, a portable computing device, other computing devices such as a laptop, or a desktop computer, cluster of computers, set-top box, and/or any other suitable electronic device that will be apparent to those skilled in the relevant art(s) without departing from the spirit and scope of the disclosure.

The controller 410 may evaluate the image of the structure 310 as captured by the imaging device 430 to identify each of the different structural elements included in the structure 310 in executing the architectural analysis of the structure 310. Identifying of the structural elements is required in executing the architectural analysis of the structure 310 such that the appropriate materials required to upgrade each of the structural elements are properly identified so that an appropriate estimate of materials necessary to upgrade the structural elements may be generated. In addition to identifying each of the different structural elements included in the structure 310 to execute the architectural analysis of the structure 310, the structural dimensions for each of the structural elements are also required such that the appropriate amounts of each material included in the structural elements may be estimated in that that the dimensions of each structural element dictates the amount of materials required to upgrade the structural element.

The controller 410 in fusing the 3D data with the image data may enable the controller 410 to measure the structural dimensions of each corresponding structural element as depicted in the image generated by the imaging device 430. As the controller 410 measures the distance between two points on the image 360 generated by the imaging device 430 to determine the structural dimensions of the structural elements, the corresponding 3D data 450 as generated by the 3D device 420 for those two points may be fused with the image 360. In doing so, the distance between each point positioned on the image 360 and the 3D data 450 may be automatically fused with the image 360 such the controller 410 may automatically determine the distance between each point positioned on the image 360 and the 3D device 450. From the distances between each point positioned on the image 360 and the 3D device 450, the controller 410 may determine the distance between each of the two points selected on the image 360 thereby generating the measurement of the distance between the two points.

For example in returning to FIG. 1, the UAV 350 may capture the image 360 of the roof 120. Due to the increased quality of the image 360, the controller 410 may identify the first plane 130*a*, the second plane 130*b*, and the ridge 180 as distinct structural elements include in the roof 120 in executing the architectural analysis. In addition to identifying the structural elements, the controller 410 may also determine the structural dimensions of the structural elements. In doing so, the controller 410 may evaluate the image 360 of the roof 120 and select a first point located on the ridge 180 and a second point located at the edge of the first plane 130*a* to determine the measurement of the structural dimension of the run 150 of the first plane 130*a*. In selecting the two points on the image 360 to determine the measurement of the run 150, the 3D data 450 associated with the two selected points is fused with the image 360 such that as the controller 410 selects the two points, the distance between the point at the ridge 180 and the point at the edge of the first plane 130*a* is determined from the image 360. In doing so, the controller 410 may then determine the distance between the point at the ridge 180 and the point on the edge of the first plane 130*a* to determine the measurement of the run 150.

The identification of each of the structural elements of the structure 310 as depicted by the image 360 and then the determination of the distance of each structural dimension associated with each of the structural elements based on the fusing of the 3D data 450 with the image data 460 depicted in the image 360 may enable the controller 410 to then generate a sketch image 480 of the structure 310. The controller 410 may display the sketch image 480 to the user via the user interface 440. The sketch image 480 depicts the structure 310 based on the distance between the 3D device 420 and each point of the 3D beam positioned on the structure 310 and the distance between each point displayed by the image 360. In doing so, the controller 410 may generate the sketch image 480 of the structure 210 that identifies each of the structural elements of the structure 310 as positioned relative to each other on the sketch image 480 as well as providing the structural dimensions of each of the structural elements and displaying the structural dimensions to the user via the user interface 440 thereby enabling the user to easily comprehend the architectural analysis of the structure 310. Thus, the sketch image 480 is a representation of the structure 210 that identifies each of the structural elements of the structure 210 as well as provides the corresponding structural dimensions of each of the structural elements.

The fusing of the 3D data 450 as generated by the 3D device 420 and the image data 460 as captured by the imaging device 430 may enable the controller 410 to identify each of the structural elements depicted by the image 360 as well as determine the structural dimensions of each of the structural elements by simply analyzing the image 360. The controller 410 does not have to move between an image 360 generated by the imaging device 430 to identify structural elements and then a 3D map generated by the 3D device 420 to determine the structural dimensions. Rather, the controller 410 may identify both the structural elements and determine the structural elements simply by analyzing the image 360 as fused with the 3D data 450 and the image data 460 thereby increasing the accuracy and the efficiency in executing the architectural analysis of the structure 310 as opposed to a surveyor physically mounting the structure 310 or a skewed image of the top-elevational view of the structure 310. As a result, significant amounts of structures may have architectural analysis executed with decreased cost and increased efficiency due to the efficient automation of the architectural analysis performed on the image 360 with the 3D data 450 fused with the image data 460.

Fusing of 3D Data and Image Data

Figure 5:
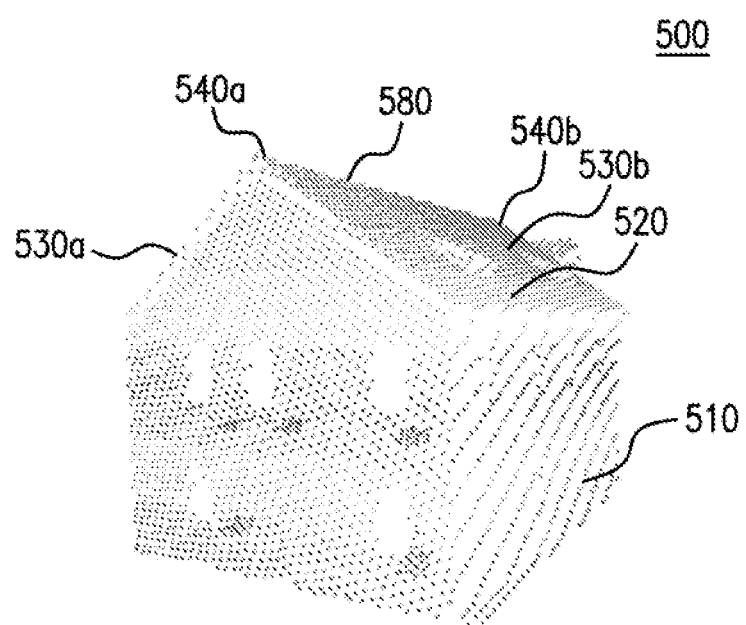
FIG. 5 illustrates a side-view of a point cloud map of the structure based on the fused 3D data and the image data that includes a plurality of cloud points that are arranged to depict a 3D representation of the structure according to an exemplary embodiment of the present disclosure.

FIG. 5 is a side-view of a point cloud map of the structure based on the fused 3D data and the image data that includes a plurality of cloud points that are arranged to depict a 3D representation of the structure. As discussed above, the controller 410 may fuse the 3D data 450 generated by the 3D device 420 with the image data 460 generated by the imaging device 430 such that the distance of each point positioned on the image 360 of the structure 310 may be fused with the corresponding location of the point on the image 360 such that the distances between any two points included in the image 360 may be determined. In fusing the 3D data 450 with the image data 460, the controller 410 may generate a point cloud map 500 of the structure 510 based on the fused 3D data 450 and the image data 460.

As shown in FIG. 5, the point cloud map 500 depicts a plurality of cloud points that is arranged to depict a 3D representation of the structure 510. Each of the cloud points included in the point cloud map 500 may be generated based on the 3D beam 340 positioning itself on each of the different positions on the structure 310 and generating 3D data 450 for each of the cloud points. The 3D data 450 for each of the cloud points may include a distance from the position of the cloud point as the 3D beam 340 is positioned at that particular point on the structure 310 to the 3D device 420. For example, the 3D device 420 may generate the 3D beam 340 and position the 3D beam 340 at the position represented by the cloud point 540*a* and the position represented by the cloud point 540*b*. The 3D data 450 generated for the cloud point 540*a* and the cloud point 540*b* is the distance from the end point of the 3D beam 340 positioned on the structure 510 at the cloud point 540*a* and the cloud point 540*b* to the 3D device 420. In doing so, the 3D data 450 included with the cloud point 540*a* and the cloud point 540*b* is the distance from the cloud point 540*a* and the cloud point 540*b* as positioned on the structure 510 from the 3D device 420.

In addition to each cloud point including 3D data 450 that provides the distance between each cloud point and the 3D device 420, each cloud point may also provide 3D data 450 that includes the distance between each cloud point and each other cloud point positioned on the point cloud map 500. As noted above, the controller 410 may determine the distance between each point as depicted by the image 360 and each other point depicted by the image 360 based on the fusion of the 3D data 450 with the image data 460. The controller 410 may determine the distance between each point depicted by the image 360 and each other point depicted by the image 360 based on the distance between each point positioned on the structure 510 and the 3D device 420. As a result, the 3D data 450 provided by each cloud point included in the point cloud map 500 may also include the distance between each cloud point and each other cloud point positioned on the point cloud map 500.

For example, the structural dimension of the ridge 580 may be determined based on the 3D data 450 provided by cloud point 540a and cloud point 540b. The 3D data 450 provided by the cloud point 540a and the cloud point 540b may provide the distance between the cloud point 540a and the cloud point 540b thereby providing the structural dimension of the ridge 580. Thus, the point cloud map 500 provides the distance between the 3D device and each cloud point included in the point cloud map 500 and the distance between each cloud point included in the point cloud map.

In addition to determining the distance of each structural element included in the structure 510 as depicted by any two cloud points positioned on the point cloud map 500, the controller 410 may also determine the structural dimension of pitch for each cloud point included the point cloud map 500. The controller 410 may determine a pitch of each plane 530a and 530b based on the distance between the 3D device 420 and each end point of the 3D beam 340 positioned on the structure 510 and the distance between each point on the image 360. Each plane 530a and 530b included in the structure 510 is a portion of the structure 510 that is positioned at a different pitch relative to each other plane included in the structure 510. As noted above, the distance between any two points as depicted by the image 360 may be required to determine the structural dimension of the distance of different dimensions included in each of the structural elements in executing the architectural analysis of the structure 510. However, the pitch of each structural element is also required to adequately execute the architectural analysis of the structure 510 to adequately upgrade the structure 510.

Each cloud point may also provide 3D data 450 that includes the pitch of each cloud point positioned on the point cloud map 500. As noted above, the controller 410 may determine the distance between each point as depicted by the image 360 and each other point depicted by the image 360 based on the fusion of the 3D data 450 with the image data 460. The controller 410 may determine the pitch of each point depicted by the image 360 based on the distance between each point positioned on the structure 510 and the 3D device 420. As a result, the 3D data 450 provided by each cloud point included in the point cloud map 500 may also include the pitch of each cloud point positioned on the point cloud map 500.

For example, the structural dimension of the pitch for the first plane 530a and the second plane 530b may be determined based on the 3D data provided by the cloud points positioned on the first plane 530a and the second plane 530b. The 3D data 450 provided by the cloud points positioned on the first plane 530a and the second plane 530b may provide the pitch of the first plane 530a and the second plane 530b. Thus, the controller 410 may determine the pitch of each plane 530a and 530b included in the structure 510 based on the distance between the 3D device 420 and each cloud point included in the point cloud map 500 and the distance between each cloud point included in the point cloud map 500. In an embodiment, each cloud point included in the point cloud map 500 may be colored coded based on the distance of each cloud point positioned from the 3D device 420. The user may also rotate the 3D point cloud map 500 of the structure 510 to assist in analyzing the structural elements included in the structure 510.

As discussed above, the controller 410 may fuse together the 3D data 450 as generated by the 3D device 420 with the image data 460 captured by the imaging device 430. In doing so, the controller 410 may determine the structural dimensions of each structural element included in the structure 310 simply by selecting different points of the structure as depicted by the image 360 of the structure 310. FIG. 6 depicts a side-view of a dual 3D and imaging device configuration such that a 3D device and an imaging device is mounted on a UAV to scan a structure to perform an architectural analysis on the structure. In an embodiment, the 3D device 420 and the imaging device 430 may be mounted on a pan tilt gimbal coupled to the UAV 350 and the gimbal may move the 3D device 420 on the x-y axis such that the 3D beam 340 may scan the roof 320 of the structure 310 at each point on the roof 320 to capture the distance of each point on the roof 320 from 3D device 420 positioned in the gimbal coupled to the UAV 350.

The 3D data 450 generated by the 3D device 420 and the image data 460 captured by the imaging device 430 may be calibrated such that the 3D data 450 aligns with the image data 460. In doing so, each point of the structure 310 as depicted by the image 360 may align with each cloud point of the structure 510 as depicted by the point cloud image 500. As the controller 410 selects a point on the structure 310 as depicted by the image 360, the selected point may align with the corresponding cloud point of the structure as depicted by the point cloud image 500 and thus provide the accurate structural dimensions for the point as depicted by the image 360 without the controller 410 having to go between the image 360 and the point cloud image 500. As a result, the controller 410 may identify a point positioned on the structure 310 as clearly depicted in the image 360 and also determine the appropriate structural dimensions for the selected point depicted in the image 360 based on the 3D data 450 for the selected point being aligned with the image data 460 depicted by the image 360.

After the controller 410 aligns the 3D data 450 with the image data 460 as depicted by the image 360 and the point cloud map 500, the controller 410 may determine different structural dimensions based on the distance from a selected point on the structure 310 as depicted by the image 360 and the 3D device 420 positioned on the UAV 350. For example, the controller 410 may select a point positioned on the edge 390 of the first plane 330a as depicted by the image 360 of the structure 310 as well as a point positioned on the ridge 380. Based on the 3D data 450 being fused with the image data 460 by the controller 410, the controller 410 may determine the edge—drone distance 620 of the point positioned on the edge 390 from the 3D device 420 positioned on the UAV 350 based on the 3D data 450 associated with the point positioned on the edge 390. The controller 410 may also determine the ridge—drone distance 630 of the point positioned on the ridge 380 from the 3D device 420 positioned on the UAV 350 based on the 3D data 450 associated with the point positioned on the ridge 380.

The 3D data 450 may also include the angle 650 between the 3D beam 340 that is positioned at the point on the ridge 380 and the 3D beam 340 that is positioned at the point on the edge 390. The controller 410 may then based on trigonometric calculations determine the structural dimensions of the distance between the point on the ridge 380 and the point on the ridge 390 which is the roof flap length L 640 as well as the pitch 610 of the first plane 330a. With the edge—drone distance 620, the ridge—drone distance 630, and the angle 650 known by the controller 410 via the 3D data 450 for each of the respective points, the controller 410 may determine the pitch 610 of the first plane 330a based on the sine of the edge—drone distance 620 and the ridge—drone distance 630. The controller 410 may then determine the roof flap length L 640 based on the cosine of the pitch 610 and the edge—drone distance 620. Thus, the controller 410 may determine different structural dimensions associated with the corresponding structural elements included in the structure 310 based on the distance of various points positioned on the structure 310 as depicted by the image 340 to the 3D device 420 as determined from the 3D data 450 that is fused with the image data 460.

Automated Segmentation

As noted above, each of the structural elements included in the structure 200 may vary significantly from each other as well as being customized with regard to the structure 200. Each structure 200 may have customized structural elements that differ from similar structural elements that are included in other structures. For example, FIG. 2 depicts a complicated roof 220 that is positioned on the house 210. There are limited structural elements that are actually symmetric structural dimensions to each other. In such an example, the fourth plane 230d and the fifth plane 230e actually include symmetric structural dimensions to each other. However, the first plane 230a, the second plane 230b, and the third plane 230c each have structural dimensions that differ significantly from each other due to the positioning of the dormer 205, the roof vent 215 and so on.

Thus, the controller 410 may segment each of the structural elements included in the structure 200 to account for the customization of each of the structural elements regardless as to whether the structural element has a cut-out included in the structural element to circumvent a roof vent 215, having customized structural dimensions, and so on. The segmenting of each of the structural elements includes the identification and/or tracing of the boundaries of the of the structural elements to delineate each of the structural elements from each of the other structural elements based on the boundaries of each of the corresponding structural elements. For example, the controller 410 may segment the first plane 230a by identifying and/or tracing the boundaries of the first plane 230a. In doing so, the controller 410 may delineate the first plane 230a from the second plane 230b, the third plane 230c, as well as the chimney 225 that is inserted through the first plane 230a such that the first plane 230a includes a cut-out to account for the chimney 225.

The controller 410 segments each plane included in the structure 200 as depicted by the image 360 of the structure 200 so that each plane is segmented from each other plane included in the structure as depicted by the image 360 based on the fused 3D data 450 and the image data 460 depicted in the point cloud map 500. Each point depicted by the image 360 corresponds to a cloud point on the point cloud map 500 that provides the distance between the 3D device 420 and each cloud point and the distance between each cloud point.

As discussed above, the 3D data 450 may be fused together with the image data 460 such that the image 360 of the structure 200 may depict each of the structural elements via the image data 460 but each point included in the structural elements may have corresponding 3D data 450 due to the fusion of the 3D data 450 with the image data 460. In doing so, the distance between each point as depicted by the image 360 and the 3D device 420 may be determined based on the image 360. Thus, the controller 410 may analyze the image 360 and segment each structural element included in the structure 200 as depicted by the image 360 to adequately differentiate each structural element from each of the other structural elements included in the structure 200.

The controller 410 determines a plurality of structural dimensions associated with each plane and a pitch associated with each plane and a plurality of distances between each plane and each other plane based on the segmentation of each plane included in the structure as depicted by the image 360 of the structure 200. As discussed above, each of the structural dimensions associated with each structural element included in the structure 200 may be determined by the controller 410 based on the fusion of the 3D data 450 with the image data 460 due to the distance between each point as depicted by the image 360 and the 3D device 420. Each of the structural dimensions such as the distance between two points included in the first plane 230a to determine the span of the first plane 230a may be determined by the controller 410 simply by identifying and/or tracing the edge on the first plane 230a between the appropriate two points include on the edge of the first plane 230a. Thus, the controller 410 may determine the various structural dimensions of each of the structural elements by identifying and/or tracing the structural elements as depicted by the image 360.

In determining the structural dimensions of each structural element included in the structure 200 based on the segmentation of each structural element by the controller 410, the controller 410 may determine the customized amounts of material that is required to adequately upgrade each of the structural elements. Each customized structural element may have unique structural dimensions that are unique to that particular customized structural element. The segmenting of the customized structural element and then determining the customized structural dimensions for the customized structural element based on the segmentation, may enable the controller 410 to accurately assess the materials required to adequately upgrade the customized structural element. For example, the first plane 230a appears to extend the length of the roof 220 of the house 210. However, the chimney 225 is included in the first plane 230a such that the first plane 230a includes a cut-out to account for the chimney 225. Simply assessing the structural dimensions of the first plane 230a without accounting for the cut-out for the chimney 225 may result in an increased order of materials to adequately upgrade the first plane 230a that is unnecessary due to the cut-out included in the first plane 230a to account for the chimney 225.

The controller 410 locates each structural element that formulates each plane included in the structure as depicted by the image 360 as designated by each line that encompasses each plane. In segmenting each structural element, the controller 410 may locate each structural element by tracing each structural element with a line that encompasses each structural element. In tracing each structural element, the controller 410 may trace the appropriate features of the structural element such that the controller 410 may determine the appropriate structural dimensions for each structural element. For example, the controller 410 may trace the boundaries of the second plane 230b to differentiate the second plane 230b from the first plane 230a and the third plane 230c. In tracing the boundaries of the second plane 230b, the controller 410 may determine the appropriate structural dimensions of the second plane 230b to determine the amount of material required to adequately upgrade the second plane 230b.

The controller 410 may identify each structural element that formulates each plane included in the structure 200 to identify a structural feature of the structural element of each plane. The structural feature is a feature provided by each element to the structure as formulated in each corresponding plane. As noted above, the controller 410 may locate each structural element included in the structure 200 by tracing the boundaries of the structural element to differentiate the structural element from the other structural elements included in the structure 200. In addition to locating, the controller 410 may also identify each structural feature included in each structural element. Each structural element may include structural features. For example, the first plane 230a includes the ridge 280 as a first boundary and then an edge 235 as a second boundary while the sixth plane 230f includes a first boundary of an eve 245. In locating each of the boundaries of each structural element via tracing each of the boundaries, the controller 410 may also identify each of the structural features that acts as the different boundaries for the structural element. In such an example, the controller 410 may identify after tracing the first boundary of the first plane 230a that the first boundary is the ridge 280 while the second boundary is the edge 235 and the first boundary of the sixth plane 230f as the eve 245.

In identifying the structural feature represented by each of the boundaries included in the structural element, the controller 410 may determine the appropriate materials required to adequately upgrade each of the structural features. For example, the material required to upgrade the ridge 280 as the first boundary of the first plane 230a may differ from the material required to upgrade the edge 235 of the second boundary of the first plane 230a while the material required to upgrade the eve 245 of the first boundary of the sixth plane 230f may also differ. Thus, the controller 410 may determine the appropriate materials required to adequately upgrade each of the different structural features represented by each of the boundaries included in the structural element based on the identification of each of the structural features by the controller 410.

The controller 410 may determine a distance of each element that formulates each plane included in the structure 200. The distance is a length dimension associated with each structural element. As noted above, the controller 410 may locate each structural element included in the structure 200 by tracing the boundaries of the structural element as well as identifying each of the structural features included in the structural element. In addition to locating and identifying, the controller 410 may also determine the distance of each traced boundary included in the structural element. As discussed in detail above, the controller 410 may determine the distance between any two points included in the image 360 due to the fusing of the 3D data 450 with the image data 460.

In doing so, the controller 410 may simply trace the appropriate boundary of the structural element from a first point to a second point and then determine the distance of the appropriate boundary based on the distance of the first point and the second point from the 3D device 420 due to the 3D data 450 being fused with the image data 460 as depicted by the image 360. For example, the controller 410 may simply trace the ridge 280 of the first plane 230a from a first point to a second point on the image 360 and may determine the distance of the ridge 280 based on the trace on the image 360. Thus, the controller 410 may locate, identify, and determine the distance of each boundary included in each structural element simply by interfacing with the image 360.

In addition to segmenting each structural element included in the structure 200, the controller 410 may also segment each obstruction positioned on the structure 200 as depicted by the image 360 of the structure 200 so that each obstruction is segmented from each plane included in the structure 200 as depicted by the image 360. Each obstruction is an obstruction positioned on the structure that is not included in any of the planes included in the structure 200. As noted above, each structural element may be customized not only with regard to the structural dimensions included in each structural element but also to account for obstructions that are positioned on the structural elements. An obstruction is not included in the structural element but is rather positioned on the structural element and is accounted for by the controller 410. Typically, the structural element may include a cut-out to account for the obstruction positioned on the structural element such that the structural element may require less material due to the cut-out to account for the obstruction as compared to if no obstruction is positioned on the structural element.

For example, the first plane 230a includes the obstruction of the chimney 225 such that the first plane 230a includes a cut-out to accommodate the chimney 225 such that the first plane 230a may require less material due to the cut-out to accommodate the chimney 225 as compared to if the chimney 225 was not positioned on the first plane 230a. In another example, the second plane 230b includes the obstruction of the roof vent 215 and the dormer 205 such that the second plane 230b includes a cut-out to accommodate the roof vent 215 and the dormer 205 such that the second plane 230b may require less material due to the cut-out to accommodate the roof vent 215 and the dormer 205. Thus, the controller 410 may segment each obstruction to delineate each obstruction from the structural element that the obstruction is positioned on.

The controller 410 may locate each obstruction that is positioned on the structure 200 as depicted by the image 360 as designated by each line that encompasses each obstruction. Similarly to how the controller 410 may locate each structural element by tracing the boundaries of the structural element as depicted by the image 360, the controller 410 may also trace the boundaries of each obstruction as depicted by the image 360 to delineate the obstruction from the structural element that the obstruction is positioned on. For example, the controller 410 may trace the boundaries of the obstruction of the skylight 255 as positioned on the seventh plane 230g to delineate the skylight 255 from the seventh plane 230g that the skylight is positioned on.

The controller 410 may also identify each obstruction that is positioned on the structure 200 to identify a structural feature that is a feature provided by each obstruction to the structure. Similarly to how the controller 410 may also identify each structural feature included in the structural element in addition to locating the structural feature, the controller 410 may also identify each obstruction that has been located by the controller 410. For example, the controller 410 may identify the obstruction of the skylight 255 as being a skylight 255 after the controller 410 traces the skylight 255 to delineate the skylight 255 from the seventh plane 270g. The controller 410 may also determine the dimensions of each located obstruction in a similar manner as the controller 410 determines the structural dimensions of the structural elements as discussed in detail above. Obstructions positioned on the structure 200 may include but are not limited to a roof vent, a chimney, a dormer, a skylight, a plumbing vent, a ridge vent, a gutter, and/or any other obstruction that may be positioned on the structure but is not a structural element that will be apparent to those skilled in the relevant art(s) without departing from the spirit and scope of the disclosure.

The controller 410 may also incorporate algorithms to improve the quality of the image 360 of the structure 200 to further assist in locating different structural elements of the structure 200 and obstructions. The controller 410 may incorporate image processing algorithms that include but are not limited to a blob detector algorithm, corner detector algorithm, edge detector algorithm, contour fitting algorithm to recognize and delineate boundaries of the structural elements as well as obstructions and/or damaged areas of the structure and/or any other type of image processing algorithm that will be apparent to those skilled in the relevant art(s) without departing from the spirit and scope of the disclosure.

In an embodiment, the user may segment each structural element and each obstruction as the user engages the image 360 of the structure 200 as displayed by the user interface 440. In performing the segmentation, the user may generate segmentation data 470 that is generated as the user engages the image 360 of the structure via the user interface 440. The controller 410 may then incorporate the segmentation data 470 into the segmentation process in segmenting each of the structural elements and the obstructions in generating the structural dimensions for each of the structural elements and the obstructions.

After each of the structural elements and the obstructions in the structure 200 have been segmented, the controller 410 may generate the sketch image of the structure that is displayed to the user that depicts each segmented plane and each segmented obstruction included in the structure 200 based on the segmentation of each plane and each obstruction relative to the distance between the 3D device 420 and each point of the 3D beam 340 positioned on the structure 200, the distance between each point on the image 360, and pitch of each plane. FIG. 7 illustrates a top-elevational view of a sketch image 700 that depicts the structure with respect to each of the segmented structural elements and obstructions as well as providing the dimensions for each of the corresponding structural elements.

As noted above, an architectural analysis of the structure 200 is required to determine the appropriate estimate as to the time, materials, and the overall scope of the work required to adequately upgrade the structure 200. The sketch image 700 of the structure transforms the structure 200 to a depiction of the image relative to each structural element such that the user may easily identify each of the structural elements included in the structure 200 rather than having to decipher each of the structural elements as depicted by image 360 of the structure 200 and/or the point cloud image 500.

The user may easily identify and assess each structural element as depicted by the sketch image 700. For example, the user may easily identify each of the structural elements 720(a-n) as depicted in the sketch image 700. Rather than having to decipher each of the structural elements as depicted in the image 360 of the structure 200, the user may easily identify and assess each of the structural elements 720(a-n) easily depicted by the sketch image 700 without any additional detail, data, obstructions, shadows, shading, and so on that may be depicted by the image 360 of the structure 200.

In addition to easily depicting each structural element of the structure 200 for the user, the sketch image 700 may also depict each of the corresponding structural dimensions for each of the structural elements such that the user may easily identify the structural dimensions of each of the structural elements. For example, the user may easily identify each of the structural dimensions 710(a-n) as depicted in the sketch image 700. Rather than having to determine the structural dimensions themselves and/or determine the structural dimensions from the point cloud map 500 and so on, the user may easily identify and assess each of the structural dimensions 710(a-n) as easily depicted by the sketch image 700 such that each structural dimension 710(a-n) is clearly associated with each corresponding structural element. In doing so, the user may easily generate an accurate estimate as to the amount of time and material required to upgrade each of the structural elements included in the structure 200 thereby providing an efficient and accurate architectural analysis of the structure 200 with a decrease in cost.

In an embodiment, the controller 410 may import the sketch image 700 into a more robust computer-aided design (CAD) package that may enable the user to further analyze the sketch image 700 that includes the structural elements 720(a-n) and the structural dimensions 710(a-n). In more complicated applications, such as generating an architectural assessment on a mining operation, the details of the structural elements 720(a-n) as well as the structural dimensions 710(a-n) may be immense as well as minute. Importing the sketch image 700 into a more robust CAD package, such as AutoCAD, the user may also incorporate the analysis tools provided by the more robust CAD package in analyzing each of the several structural elements 720(a-n) as well as the structural dimensions 710(a-n).

For example, the controller 410 may import the sketch image 700 of a complicated bridge that is to be upgraded and includes an immense amount of structural elements 720(a-n) and corresponding structural dimensions 710(a-n) into SolidWorks. The user may then incorporate the robust tools included in SolidWorks to analyze each of the minute structural elements 720(a-n) and corresponding structural dimensions 710(a-n). The controller 410 may import the sketch image 700 in CAD packages that include but are not limited to AutoCAD, SolidWorks and/or any other type of CAD system that may assist in analyzing the sketch image 700 that will be apparent to those skilled in the relevant art(s) without departing from the spirit and scope of the disclosure.

In such an embodiment, the controller 410 may map each of the pixels included in the sketch image 700 to a corresponding pixel included in the CAD package. In doing so, the fused 3D data 450 and image data 460 that is incorporated into each pixel of the sketch image 700 may be mapped to a corresponding pixel included in the CAD package such that the CAD package may continue to analyze each pixel that includes the fused 3D data 450 and the image data 460. Thus, the display of the sketch image 700 by the CAD package may be seamless to the user while enabling the user to incorporate each of the tools included in the CAD package to further analyze the structural elements 720(a-n) and the corresponding structural dimensions 710(a-n) depicted by the sketch image 700

Neural Network

Returning to FIG. 4, the neural network 415 may assist the controller 410 in identifying each of the structural elements and the obstructions as well as the corresponding structural dimensions for the structure 200. As noted above, the controller 410 may segment each of the structural elements and obstructions. In doing so, the controller 410 may locate each structural element and obstruction by tracing the boundaries of the structural element and the obstruction. The controller 410 may identify each structural element and obstruction. The controller 410 may also determine the appropriate structural dimensions for the structural element and obstruction. Each time that the controller 410 locates, identifies, and determines the structural dimensions for the structural element and obstruction, the controller 410 may provide this data as learning data 495 and provide the learning data 495 to the structural element server 405.

The neural network 415 may then apply a neural network algorithm such as but not limited to a multilayer perceptron (MLP), a restricted Boltzmann Machine (RBM), a convolution neural network (CNN), and/or any other neural network algorithm that will be apparent to those skilled in the relevant art(s) without departing from the spirit and scope of the disclosure. Each time that a data set of learning data 495 that locates the particular structural element and/or obstruction, the identifying of the particular structural element and/or obstruction, and the appropriate structural dimensions for the particular structural element and/or obstruction, the neural network 415 may continue to accumulate each received data set of learning data 495 to further improve the accuracy of the controller 410 in segmenting each of the structural elements and/or obstructions included in the structure 200. The neural network 415 may provide the improved location and identification of each structural element and/or obstruction via the segmented data 455 to the controller 410 such that the controller 410 may continue to learn upon each structural element and/or obstruction that is located, identified, and measured.

As the neural network 415 learns with each data set of learning data 495 that includes the location, identification, and the structural dimensions of the particular structural element and/or obstruction, the neural network 415 may assist the controller 410 such that the controller 410 in segmenting each structural element and/or obstruction may eventually mimic the success of a human actually segmenting each structural element and/or obstruction. The fusion of the 3D data 450 and the image data 460 may provide an additional layer of information for the neural network 415 to learn from in that as the controller 410 segments each structural element and/or obstruction as depicted by the image 360, the learning data 495 provided to the neural network includes the appropriate structural dimensions for the segmented structural element and/or obstruction. Rather than simply providing the location and identification information as determined from the image data 460 provided by the image 360, the appropriate structural dimensions are also provided from segmenting the structural elements and/or obstructions via the image 360 based on the 3D data 450 fused with the image data 460 in the image 360. Thus, the accuracy as well as the rate in which the neural network 415 continues to learn and recognize in assisting the controller 410 in segmentation may also increase.

For example, examining the image 360 with regard to the top-elevational view of the structure 200, often times different shapes of the structural elements, different shades of the structural elements, different textures of the structural elements, and/or any convolutions in the structural elements may increase the difficulty in accurately segmenting each of the structural elements. Returning to FIG. 2 that depicts a complicated structure 200 with regard to a complicated roof 220, segmenting the plane 230*f* based on evaluating the image 360 of the structure 200 may be difficult due to different shadows and/or shading that may be incorporated onto the roof 220 based on the various planes and other structural elements as well as obstructions.

In addition to segmenting the plane 2301, locating and identifying the eve 245 may also be difficult as due to the different shadows and/or shading, the eve 245 may look like an edge rather than eve 245 thereby preventing the eve 245 from being accurately located and identified. Over time with an increase in the sample size depicted by the learning data 495 and deciphered by the neural network 415, the neural network 415 may increase the accuracy in the controller 410 adequately segmenting the plane 230*f* as well as accurately locating and identifying the eve 245 regardless of the shadows and/or shading depicted by the image 360 of the structure 220 by providing segmented data 455 to the controller 410 that is of increased accuracy. The segmented data 455 may be of increased accuracy due to the increase in sample size of learning data 495 that depicts various locations, identifications, and structural dimensions for various structural elements and obstructions captured from various structures with various different settings such as shading and/or shadows. Thus, with each set of learning data 495 provided to the neural network 415, the accuracy of the segmented data 455 provided to the controller 410 by the neural network 415 to assist the controller 410 in accurately segmenting the structural elements and obstructions continues to improve.

In an embodiment, in addition to the location and identification that is determined from the image data 460, color information may also be determined from the image data 460. Each image captured by the image device 430 may also include color information in that each portion of the image captured by the image device 430 includes different shades of color. In doing so, the different structural elements and/or obstructions captured by the image 360 may have different shades of color resulting in different color information that is captured by the image 360 and is included in the image data 460. The different color information that is included in the image data 460 may provide additional insight as to the type of structural element and/or obstruction that is associated with the different color information. For example, eve 245 may have increased shading as depicted in the captured image 360 while other structural elements and/or obstructions may have decreased shading. Thus, the color information associated with each structural element and/or obstruction and included in the image data may provide additional insight as to the identification of the corresponding structural element and/or obstruction.

In doing so, the controller 410 may incorporate the different color information included in the image data 460 into the learning data 495 that is provided to the structural element server 405. The controller 410 may then provide the learning data 495 to the structural element server 405 that not only includes the location, identification, and the structural dimensions of the particular structural element and/or obstruction but the color information as well. The addition of the color information to the location, identification, and the structural dimensions may further enhance the neural network 415 in assisting the controller 410 such that the controller 410 in segmenting each structural element and/or obstruction may eventually mimic the success of a human actually segmenting each structural element and/or obstruction. The fusion between the 3D data 450 and the image data 460 that includes the color information may further improve and provide an additional layer of information for the neural network 415 to learn from in that as the controller 410 segments each structural element and/or obstruction as depicted by the image 360, the learning data 495 provided to the neural network 415 includes the appropriate structural dimensions for the segmented element and/or obstruction.

For example in an embodiment, the different segments may be annotated via color such that each segment is portrayed to the neural network 415 as being associated with a specified color. Rather than simply providing the location and identification information as determined from the image data 460 provided by the image 360, a specified color is also annotated to each segment such and provided to the neural network 415 in the segmenting of the structural elements and/or obstruction via the image 360 based on the 3D data 450 fused with the image data 460 in the image 360. Thus, the accuracy as well as the rate in which the neural network 415 continues to learn and recognize in assisting the controller 410 in segmentation may also increase.

In an embodiment, the controller 410 may fuse the 3D data 450 generated by the 3D device 420 with the image data 460 generated by the imaging device 430 such that the distance of each point positioned on the image 360 of the structure 310 may be fused with the corresponding location of the point on the image 360 such that the distances between any two points may be determined. In addition to the distance of each point positioned on the image 360 of the structure fused with the corresponding location of the point on the image, the color information may also be fused with the corresponding location of the point on the image. In doing so, each point on the image 360 associated with the point as well as a color associated with the point. In fusing 3D data 450 with the image data 460 that includes the color information in addition to the distance for each point, the controller 410 may generate the point cloud map 500 of the structure 510 based on the fused 3D data 450 and the image data 460 that includes both the distance and the color information.

In an embodiment, each of the different layers of information included in the learning data 495 provided by the controller 495 to the neural network 465 may include the color information associated with each pixel bounded by a segment boundary that has been segmented. The different layers of information included in the learning data 495 provided by the controller 495 to the neural network 415 may also include annotation and/or label information associated with the segment. The different layers of information included in the learning data 495 provided by the controller 495 to the neural network 465 may also include the distance information associated with each cloud point 540(*a*-*n*) from the point cloud 500 that is included in the segment and is fused to the location of each corresponding pixel included in the image 360 and the color of each corresponding pixel included in the image 360. Additional data captured from devices other than the 3D device 420 and the imaging device 450, such as thermal imaging and/or radar data, may also be included in the learning data 495 provided by the controller 495 to the neural network 415 to account for any water damage, humidity level, heat leakage, structural damage, and so on.

In an embodiment, the 3D device 420 and the imaging device 430 may be mounted to the UAV 350 to incorporate the 3D data 420 and the image data 460 into search and rescue operations, structural and architectural analysis, utility monitoring, damage reports, environmental exposure, gas levels, and so on. The 3D device 420 and the imaging device 430 mounted to the UAV 350 may analyze telemetry data and/or geolocation data that is tagged with sensor data from remote nodes to aid with search and rescue operations and/or wildlife monitoring and/or disaster relief and/or restoration operations. The mounting of the 3D device 420 and the imaging device 460 onto UAV 350 may provide additional benefits in widening the search area, achieving longer communication rangers, and/or avoiding obstacles in urban and/or suburban communities. Increased communication ranges may be achieved when UAV 350 are flying at increased altitudes above sea level to provide increased communication ranges than achieved at sea level due to the curvature of the earth. Such applications may include search and rescue in Man Over Board scenarios at sea, locating persons and/or objects in remote areas such as mountain or forest terrains, loan work monitoring and/or communications.

In an embodiment, the 3D device 420 and the imaging device 430 may be mounted on the UAV 350 that communicates over the sub-GHz range of wireless communication. The 3D device 420 and the imaging device 430 may be equipped with a geolocation transceiver to acquire and/or send the location of the 3D device 420 and the imaging device 430, The 3D device 420 and the imaging device 430 may draw power from the UAV battery and/or be equipped with their own batter and/or be solar powered. The controller 410 may store data for asynchronous retrieval by the operator and/or may be equipped with a satellite and/or communication transceiver to relay sensor and/or telemetry data in real-time. The data streams may be geo tagged. The 3D device 420 and the imaging device 430 may include additional sensors such as cameras, radiation sensors, air quality sensors, three-dimensional acquisition devices and so on.

CONCLUSION

It is to be appreciated that the Detailed Description section, and not the Abstract section, is intended to be used to interpret the claims. The Abstract section may set forth one or more, but not all exemplary embodiments, of the present disclosure, and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) the various changes in form and detail can be made without departing from the spirt and scope of the present disclosure. Thus the present disclosure should not be limited by any of the above-described exemplary embodiments, but should be defined only in accordance with the following claims and their equivalents.

What is claimed is:

1. An automated structural feature analysis system, comprising:
   a Three-Dimensional (3D) device configured to emit a volume scanning 3D beam that scans a structure to generate 3D data that is associated with a distance between the 3D device and each end point of the 3D beam positioned on the structure,
   an imaging device configured to capture an image of the structure to generate image data associated with the structure as depicted by the image of the structure; and
   a controller configured to:
   fuse the 3D data of the structure generated by the 3D device with the image data of the structure generated by the imaging device to determine the distance between the 3D device and each end point of the 3D beam positioned on the structure and to determine a distance between each point on the image, wherein the controller is further configured to:
   locate each element that formulates each plane included in the structure as depicted by the image as designated by each line that encompasses each plane;
   identify each element that formulates each plane included in the structure to identify a structural feature of each element of each plane, wherein the structural feature is a feature provided by each element to the structure as formulated in each corresponding plane; and determine a distance of each element that formulates each plane included in the structure, wherein the distance is a length dimension associated with each element, and generate a sketch image of the structure that is displayed to the user that depicts the structure based on the distance between the 3D device and each point of the 3D beam positioned on the structure and the distance between each point on the image.

2. The automated structural feature analysis of claim 1, wherein the controller is further configured to:

determine a pitch of each plane included in the structure based on the distance between the 3D device and each end point of the 3D beam positioned on the structure and the distance between each point on the image, wherein each plane included in the structure is a portion of the structure that is positioned at a different pitch relative to each other plane included in the structure.

3. The automated structural feature analysis system of claim 2, wherein the controller is further configured to determine the pitch of each plane included in the structure based on the distance between the 3D device and each cloud point included in the point cloud map and the distance between each cloud point included in the point cloud map.

4. The automated structural feature analysis system of claim 3, wherein the controller is further configured to:

determine a plurality of dimensions associated with each plane and a pitch associated with each plane and a plurality of distances between each plane and each other plane based on the segmentation of each plane included in the structure as depicted by the image of the structure.

5. The automated structural feature analysis system of claim 4, wherein the controller is further configured to:

segment each obstruction positioned on the structure as depicted by the image of the structure so that each obstruction is segmented from each plane included in the structure as depicted by the image, wherein each obstruction is an obstruction positioned on the structure that is not included in any of the planes included in the structure.

6. The automated structural feature analysis system of claim 5, wherein the controller is further configured to:

generate the sketch image of the structure that is displayed to the user that depicts each segmented plane and each segmented obstruction included in the structure based on the segmentation of each plane and each obstruction relative to the distance between the 3D device and each point of the 3D beam positioned on the structure, the distance between each point on the image, and the pitch of each plane.

7. The automated structural feature analysis system of claim 1, wherein the controller is further configured to:

generate a point cloud map of the structure based on the fused 3D data and the image data that includes a plurality of cloud points that is arranged to depict a three-dimensional (3D) representation of the structure, wherein the point cloud map provides the distance between the 3D device and each cloud point included in the point cloud map and the distance between each cloud point included in the point cloud map.

8. The automated structural feature analysis system of claim 7, wherein the controller is further configured to:

segment each plane included in the structure as depicted by the image of the structure so that each plane is segmented from each other plane included in the structure as depicted by the image based on the fused 3D data and image data depicted in the point cloud map, wherein each point depicted by the image corresponds to a cloud point on the point cloud map that provides the distance between the 3D device and each cloud point and the distance between each cloud point.

9. The automated structural feature analysis system of claim 1, wherein the controller is further configured to:

locate each obstruction that is positioned on the structure as depicted by the image as designated by each line that encompasses each obstruction; and identify each obstruction that is positioned on the structure to identify a structural feature of each obstruction that is positioned on the structure, wherein the structural feature is a feature provided by each obstruction to the structure.

10. A method for automatically generating and analyzing structural features of a structure, comprising:

emitting a volume scanning Light Detection and Ranging (3D) beam that scans a structure to generate 3D data that is associated with a distance between the 3D device and each end point of the 3D beam positioned on the structure;

capturing an image of the structure to generate image data associated with the structure as depicted by the image of the structure;

fusing the 3D data of the structure generated by a 3D device with the image data of the structure generated by an imaging device to determine the distance between the 3D device and each end point of the 3D beam positioned on the structure and determine a distance between each point on the image;

locating each element that formulates each plane included in the structure as depicted by the image as designated by each line that encompasses each plane;

identifying each element that formulates each plane included in the structure to identify a structural feature of each element of each plane, wherein the structural feature is a feature provided by each element to the structure as formulated in each corresponding plane; and determine a distance of each element that formulates each plane included in the structure, wherein the distance is a length dimension associated with each element; and generating a sketch image of the structure that is displayed to the user that depicts the structure based on the distance between the 3D device and each point of the 3D beam positioned on the structure and the distance between each point on the image.

11. The method of claim 10, further comprising:

determining a pitch of each plane included in the structure based on the distance between the 3D device and each end point of the 3D beam positioned on the structure and the distance between each point on the image, wherein each plane included in the structure is a portion of the structure that is positioned at a different pitch relative to each other plane included in the structure.

12. The method of claim 11, further comprising:

generating a point cloud map of the structure based on the fused 3D data and the image data that includes a plurality of cloud points that is arranged to depict a three-dimensional (3D) representation of the structure, wherein the point cloud map provides the distance between the 3D device and each cloud point included in the point cloud map and the distance between each cloud point included in the point cloud map.

13. The method of claim 12, further comprising:

determining the pitch of each plane included in the structure based on the distance between the 3D device and each cloud point included in the point cloud map and the distance between each cloud point included in the point cloud map.

14. The method of claim 13, further comprising:

segmenting each plane included in the structure as depicted by the image of the structure so that each plane is segmented from each other plane included in the structure as depicted by the image based on the fused 3D data and image data depicted in the point cloud map, wherein each point depicted by the image corresponds to a cloud point on the point cloud map that provides the distance between the 3D device and each cloud point and the distance between each cloud point.

15. The method of claim 14, further comprising:

determining a plurality of dimensions associated with each plane and a pitch associated with each plane and a plurality of distances between each plane and each other plane based on the segmentation of each plane included in the structure as depicted by the image of the structure.

16. The method of claim 10, further comprising:

segmenting each obstruction positioned on the structure as depicted by the image of the structure so that each obstruction is segmented from each plane included in the structure as depicted by the image, wherein each obstruction is an obstruction positioned on the structure that is not included in any of the planes included in the structure.

17. The method of claim 16, further comprising:

locating each obstruction that is positioned on the structure as depicted by the image as designated by each line that encompasses each obstruction; and identifying each obstruction that is positioned on the structure to identify a structural feature provided by each obstruction to the structure.

18. The method of claim 17, further comprising:

generating the sketch image of the structure that is displayed to the user that depicts each segmented plane and each segmented obstruction included in the structure based on the segmentation of each plane and each obstruction relative to the distance between the 3D device and each point of the 3D beam positioned on the structure, the distance between each point on the image, and the pitch of each plane.

* * * * *